Figure 1:
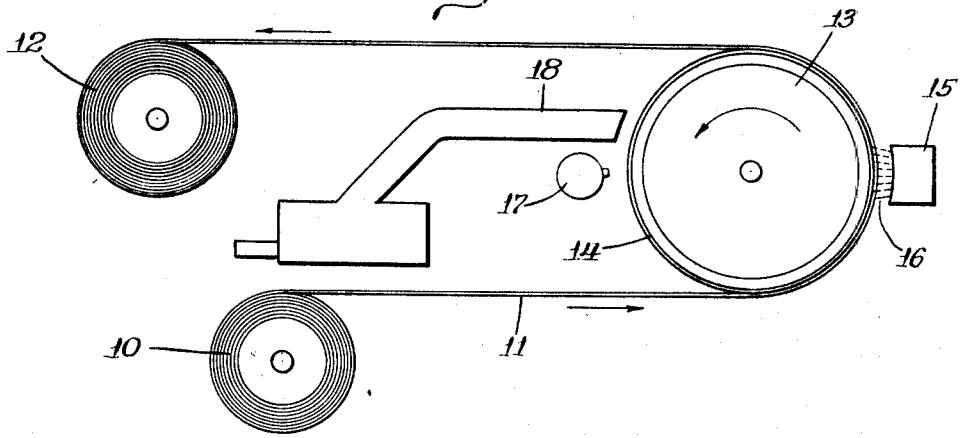

July 23, 1968

R. MacDUFF 3,394,211

PERFORATION OF SHRINKABLE FILMS

Filed Dec. 24, 1963

INVENTOR.
Richard MacDuff
BY
Atty.

3,394,211
PERFORATION OF SHRINKABLE FILMS

Richard MacDuff, Rolling Meadows, Ill., assignor to The Kendall Company, Boston, Mass., a corporation of Massachusetts
Filed Dec. 24, 1963, Ser. No. 333,111
6 Claims. (Cl. 264—154)

This invention relates to an improvement in the perforation of thermoplastic sheets; in particular, an improvement in the perforation of heat shrinkable thermoplastic sheets.

This invention is an improvement in the perforating process disclosed and claimed in U.S. Patent 3,012,918. This patent teaches a method of perforating in which a surface of a thermoplastic sheet, including both the areas thereof to be perforated and not to be perforated, is exposed to heat at a temperature sufficient to melt the sheet. The portion of the sheet eventually to become the matrix of the perforated sheet does not melt, even though the heat is directly applied to the surface of this portion of the sheet as well as to the intermittent portions of the sheet which are melted to form openings in the sheet.

The matrix portion of the sheet is prevented from melting by selectively cooling this portion during the application of heat. In accordance with one embodiment of the invention disclosed in said U.S. patent, this may be accomplished by supporting the film on the matrix surface of a grid which is cooled to a temperature below the melting point of the thermoplastic sheet. The grid matrix surface may be cooled in any convenient manner, such as by directing a stream of cool air against the grid matrix surface after the thermoplastic sheet is removed therefrom after the heat application.

Cooling the supporting matrix surface, such as the grid matrix surface, by means of an air stream at ambient temperatures is usually effective to maintain a temperature differential between the melting point of the thermoplastic sheet and the grid matrix surface sufficient to prevent uncontrolled melting of the sheet during the application of heat at temperatures substantially above the melting point of the thermoplastic sheet. As described in U.S. Patent 3,012,918 the supporting grid matrix surface becomes heated during a continuous production run. The temperature of the supporting surface, in the form of a 41" wide surface on a roll, may range from about 130° F. to about 270° F. and higher during a production run in which the heat source applied to the exposed surface of the film is a gas flame at a temperature of from about 1600° F. to 2000° F. and the circumferential surface speed of the roll is from 10 to 50 yards per minute.

Difficulties may be encountered under such conditions in the perforation of heat shrinkable films, particularly in the case of films having relatively low shrink temperatures. In these cases the film may shrink immediately upon contact with the supporting grid matrix surface and/or during application of heat to the exposed surface of the film. As contemplated in the teachings of the aforementioned patent, such films may be perforated by the process therein disclosed by employing appropriate cooling, heating and dwell time conditions. Dwell time, of course, is the length of time the film is subjected to the heating step. Special heat transfer apparatus, such as a refrigeration system for the roll may be used to maintain the supporting grid matrix surface at a temperature below the film shrink temperature. Also, depending upon the shrink properties of the film, temperature sensing and associated control means may be used to provide a temperature differential between the melting heat applied to the one surface of the film and the cooling means applied to the other side of the film in the matrix area thereof to maintain the matrix of the film at a temperature below the shrink temperature of the film during the perforation step.

As will hereinafter be described, heat shrinkable films can be perforated with substantially no loss, if any, in the original dimensions of the film, even though the conditions of heating, cooling and dwell time are those that would otherwise cause substantial, if not complete, shrinkage of the film. Specifically, it is not necessary to maintain the temperature of the means for cooling the matrix of the film below the shrink temperature of the film. The melting heat during the perforating step can be applied to the one surface of the film, including both the matrix area and areas to be perforated. It is not necessary to prevent the heating medium from coming into contact with the matrix area of the film. Further, the use of temperature control and coordinating means for maintaining the aforedescribed temperature differential are rendered unnecessary. Accordingly, this invention eliminates the need for complex equipment in the perforation of heat shrinkable films, which equipment would otherwise stand idle in the perforation of films that do not exhibit the properties of shrinkable films. The process of this invention is not dependent upon the setting and maintenance of complex devices, a feature which is obviously advantageous for commercial production operations.

Essentially, this invention consists of restraining the film against transverse and/or longitudinal movement in the plane of the film as the film is subjected to the perforating process of U.S. Patent 3,012,918. This may be accomplished by holding the edges of the sheet against movement toward each other during exposure to the melting heat and, preferably, also just prior to and after said exposure. Any suitable means may be used to hold the edges of the sheet against such movement. Specifically, the edges of the sheet may be so restrained by means of a pressure-sensitive adhesive engaging both the edges of the sheet and the corresponding edges of the supporting grid matrix.

Figure 2:
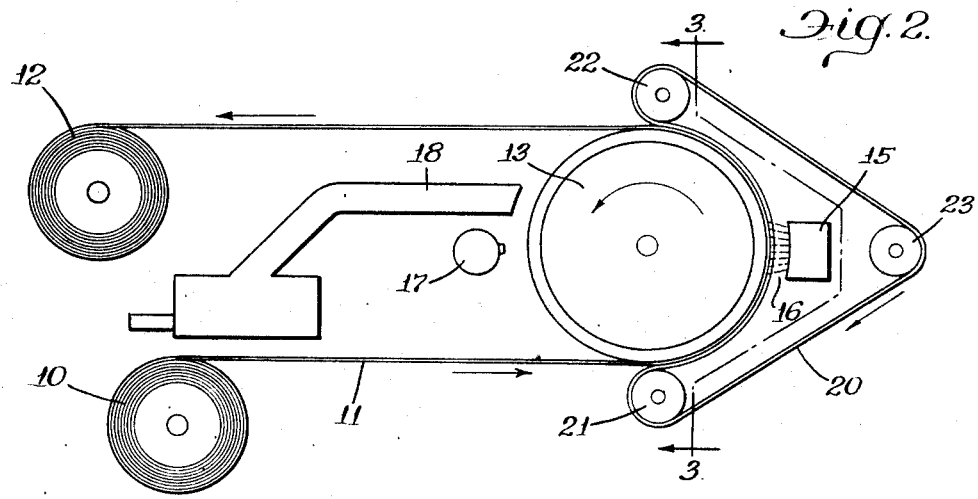
Figure 3:
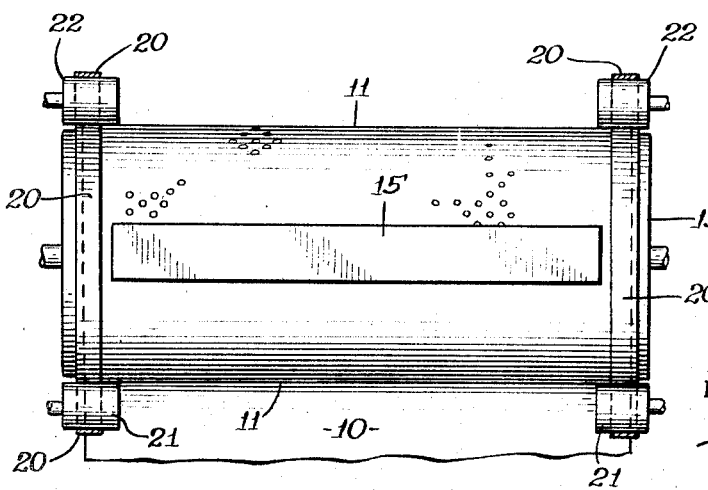

Instead of adhesive engagement, the edges of the film may be frictionally engaged with the edges of the grid matrix, as by clamping the film against the edges of the grid. The variety of conditions and apparatus that may be employed in the practice of this invention will be apparent from the following description with specific reference to the drawings, in which FIG. 1 is a diagrammatic representation of an apparatus useful in the process of this invention wherein the film is adhesively engaged to the edges of the grid surface;

FIG. 2 is also a diagrammatic representation of an apparatus wherein the film is clamped to the edges of the grid; and FIG. 3 is a fragmentary view of the apparatus of FIG. 2 taken from the burner side of the apparatus along the line 3—3.

In the drawings the same numerals are used to designate elements common to all figures. In each figure a film 11 is drawn from a supply roll 10, over and in contact with the circumferential surface of a rotating roll 13, and then to a wind-up roll 12. During its path of travel supported on the roll 13, the film 11 passes through a heating zone. This zone is represented by a gas burner 15 which directs a gas flame 16 against the exposed surface of the film. The numeral 17 designates an air nozzle through which a stream of cooling air is directed against the surface of roll 13 during its rotation. The numeral 18 designates an air exhaust vent through which air in the vicinity of the surface of the roll 13 is withdrawn by appropriate suction exhaust means. The vent may be located either prior to or after the nozzle 17. The surface of roll 13 is intermittently interrupted with voids, such as by perforations, depressions or pits, thus providing an outermost circumferential surface that serves as a grid matrix surface against which the film is in contact and is supported thereon. Only those portions of the film overlying the voids in the surface of roll 13 become melted to form perforations upon exposure of the film surface to the flame 16.

Referring to FIG. 1, the numeral 14 designates a double faced pressure-sensitive adhesive tape. The tape is adhered to the grid matrix surface at the peripheral edge of the roll 13. Another strip of the tape is also adhered to the surface of the roll at the other edge thereof. In running the process the film 11 is brought into contact with the roll 13, the longitudinal edges of the film overlying and coming into adhesive contact with the adhesive tape. The tape retains the longitudinal edges against movement toward each other during passage through the heating zone as previously described. The perforated film is subsequently stripped from the adhesive tapes 14 upon removal from the roll 13 in its path of travel to the wind-up roll 12. A specific example of the process by temporarily adhering the edges of a heat shrinkable film to the roll as described in FIG. 1 follows.

The heat shrinkable film was a transparent, irradiated, biaxially oriented polypropylene film. The film was approximately ¾ mil thick and 40″ wide. The film was passed over a grid roll, such as roll 13, having a pair of double-faced adhesive strips, each about 1″ wide, at the peripheral edges thereof to which the film adhered in the manner previously described with respect to FIG. 1. The grid surface of the roll was about 41″ wide. The outermost supporting grid surface of the roll contained about 237 voids or perforations per square inch, each approximately 33 mils in diameter. The film was drawn from a supply roll and wound up upon a center-wind driven take-up spindle. The grid roll was freely rotatable and rotated with the passage of the film over it. Heat was applied by directing the flames from a ribbon gas burner against the exposed surface of the moving film. A cooling stream of compressed air was directed against the grid surface of the roll. Air was withdrawn from the vicinity of the grid surface prior to passage of the grid surface into the stream of compressed air. The temperature of the flame was estimated to be within the range of 1700°–2000° F. The feed rate of the film was approximately 10 yards per minute through the heating zone. The process was operated for a period of time to permit the temperatures to reach a state of equilibrium. The temperature of the grid matrix surface at the edge of the roll was about 150°–170° F. and at the center surface thereof was about 250°–270° F. The film was perforated with about 237 holes per square inch of treated film. The size of the perforations in the film were slightly smaller (approximately 25 mils in diameter) than the perforations in the grid matrix surface. The treated film retained its transparency in the matrix portions thereof. No shrinkage of the treated film was observed. In some runs of other samples of the shrinkable polypropylene film and other shrinkable films slight reductions in the width of the films were detected. The slight reductions in the dimensions of the films were inconsequential for practical, commercial purposes. Furthermore, no puckering or distortion occurred in the matrix portions of the perforated films, even though the films were exposed to temperatures well above the temperatures employed in the commercial use of the films in shrink-packaging applications. In the case of shrinkable polypropylene, for example, the film shrink temperatures may range from about 220° to 330° F. Recommended hot air temperatures for shrink packaging with this film range from 300° to 450° F. Higher temperatures may be used, but only with the exercise of greater care because of the melting point of the film and the relatively high shrink tension of the film. The shrink tension of shrinkable biaxially oriented polypropylene films may vary from 300–500 p.s.i. at the aforesaid film shrink temperatures. The perforated shrinkable polypropylene produced as described above was heat shrinkable and satisfactory for use in shrink-packaging of food, such as vegetables and the like where openings in the film are desired.

Samples of the same polypropylene film were processed in the same manner described above, except that the adhesive strips were removed from the supporting grid roll. Thus, the film was not adhesively adhered to the peripheral edges of the roll. The operating conditions were the same as the conditions for the run previously described, or as nearly the same as practically possible. The film samples shrunk from 5 to 10% in the transverse direction while in contact with the roll. Slit-like openings were burnt through the film. This indicates that the film was in a state of movement while exposed to the gas flame, shifting from underlying portions of the grid surface to perforations in the grid. The treated film was wrinkled. The matrix portion of the film changed from water-white to milky white in appearance.

FIGS. 2 and 3 are illustrative of means other than adhesive means that may be employed to retain the dimensions of the perforated film the same or practically the same as the film before the perforation process. In this apparatus flexible bands 20 located at each edge of the grid roll 13, as clearly shown in FIG. 3, serve to clamp the edges of the film 11 against the edges of the roll as the film passes over the roll and through the heating zone. Preferably, the film is so clamped during its entire path of travel while in contact with the roll. The edges of the film are thus retained against movement toward each other while processing the film on the roll.

The bands 20 are continuous bands of heat resistant material preferably. Suitable metal bands are commercially available. The bands are held in place by idler rolls 21, 22 and 23 upon which the bands ride. The portion of the band overlying the edge of the gril roll 13 at any given movement during operation is urged toward the grid roll. For this purpose the idler rolls may be appropriately spring loaded to force the overlying band portion towards the roll. Anyone of the idler rolls may be spring loaded, but the preference is for spring-loading idler rolls 21 and 22 adjacent the grid, or at least idler roll 21 at the point of entry of the film between the bands 20 and the grid roll 13, to facilitate threading the film through the apparatus. If not fixed in position, idler rolls 21 and 22 are of course spring loaded to urge them in a direction generally to the left, and idler roll 23 is loaded to urge it to the right, as viewed in FIG. 2.

At start-up of the process the edges of the film are threaded between the grid surface of roll 13 and the overlying bands 20 at the idler rolls 21. The film is brought over roll 13 with the film edges underneath the bands 20 and then to the wind-up roll 12 as shown in FIGS. 2 and 3. The tension in each band 20 is then appropriately adjusted (such as by adjustment of springs urging rolls 21 and 22 to the left as aforedescribed) to clamp the underlying edges of the film 11 against roll 13. The tension in each band is adjusted so that the band is driven with the film in frictional engagement therewith as the film and roll 13 move. The direction of movement of the bands 20 is shown by the arrow in FIG. 2.

Examples of other heat shrinkable films in addition to the polypropylene film that may be processed in accordance with this invention are molecularly oriented films of irradiated polyethylenes, polystyrene, polyvinyl-chloride, vinylidene chloride/vinyl chloride copolymers and rubber hydrochloride. The films may be either uniaxially or biaxially oriented. The most common shrinkable films are biaxially oriented films because the majority of shrink-packaging applications require balanced shrinkage. The shrinkable films ordinarily have a shrink tension of at least 50 p.s.i. at the film shrink temperature. Preferred films for shrink-packaging applications are films having a shrink tension of at least 100 p.s.i. Films that develop such shrink tensions at about 212° F. conveniently can be shrunk by immersion in boiling water. Perforated films which shrink upon immersion in hot water lend themselves readily to packaging of tea in the familiar form of "tea bags," for example. The water can pass through the perforations in the bag walls to extract the tea flavor from the tea leaves. The flavor extract can be squeezed from the tea leaves upon shrinkage of the film walls of the bag. A film suitable for such food packages is oriented irradiated polyethylene film (density 0.90–0.925) having a shrink tension range of about 150–500 p s.i. at film shrink temperatures of 160°–240° F. and which can exhibit as high as 70–80% shrinkage. Another suitable film for this purpose is biaxially oriented irradiated polyethylene (density 0.926–0.940) having a shrink tension range of 250–1000 p.s.i. at shrink temperatures of 200°–280° F. and a maximum shrinkage of 70–80%.

It should be understood that the shrink properties of shrinkable films depends not only on the composition of the film but also its prior history. The values of the shrink properties given herein are average values of films commercially available for shrink packaging. The values reported for other shrinkable films are as follows. Uniaxially oriented polyvinylchloride has a shrink tension of 150–300 p.s.i. at a shrink temperature of 150°–300° F. and a maximum shrinkage of 50–70%. For biaxially oriented vinylidene chloride/vinyl chloride films, the shrink tension ranges from 50–150 p.s.i. at shrink temperatures of 150°–210° F. These films may shrink as high as 60% of the original dimensions. For biaxially oriented irradiated polypropylene the shrink tension ranges from 300–600 p.s.i. at shrink temperatures of 220°–330° F.; these films exhibit maximum shrinkage of 70–80%. For biaxially oriented rubber hydrochloride films the shrink tension ranges from 150–350 p.s.i. at shrink temperatures of 150°–230° F. These films exhibit maximum shrinkage of 40–50%. Polystyrene biaxially oriented films exhibit shrink tensions of 100–600 p.s.i. at shrink temperatures of 210–270° F. and shrinkage as high as 60% from the original film dimensions.

The invention claimed is:

1. A method of perforating a heat-shrinkable sheet of thermoplastic material comprising the steps of:
    (a) applying heat to the entire surface of a section of said sheet including areas within said section chosen for perforation to melt said sheet within the chosen areas to form perforations therein, said heat also being applied to areas of said sheet surrounding said chosen areas;
    (b) simultaneously selectively maintaining the surrounding areas at a temperature below the temperature at which the chosen areas melt during the application of heat; and
    (c) retaining the edges of the sheet bounding said section against movement toward each other during the application of said heat at a temperature sufficient to melt through said chosen areas.

2. A method in accordance with claim 1 wherein said sheet is a film having a shrink tension of at least about 100 p.s.i.

3. A method in accordance with claim 1 wherein said sheet is selected from the group consisting of oriented polyethylene and polypropylene films having a shrink energy of at least about 100 p.s.i.

4. A method of perforating a heat-shrinkable sheet of thermoplastic material comprising:
    (a) supporting said sheet from one side thereof only on a moving base, the surface of which base is intermittently interrupted with voids;
    (b) retaining the longitudinal edges of the sheet on said base against movement relative thereto;
    (c) directing a stream of hot gas into contact against the surface of said sheet on the other side thereof, said gas having a temperature at least equal to the melting temperature of said sheet, said gas melting the portions of the sheet overlying said voids to form perforations therein; and
    (d) maintaining the surface of said base between and around said voids at a temperature below the temperature at which said portions of the sheet melt to maintain said sheet in contact with said surface at a temperature below its melting temperature.

5. A method in accordance with claim 4 wherein said sheet is a film having a shrink tension of at least about 100 p.s.i.

6. A method in accordance with claim 4 wherein said sheet is selected from the group consisting of oriented polyethylene and polypropylene films having a shrink energy of at least about 100 p.s.i.

References Cited

UNITED STATES PATENTS

| | | | |
|---|---|---|---|
| 2,517,570 | 8/1950 | Irons | 264—230 |
| 2,560,038 | 7/1951 | Trainer | 264—288 X |
| 2,702,406 | 2/1955 | Reed | 264—289 X |
| 2,728,941 | 1/1956 | Alles et al. | 264—288 X |
| 3,012,918 | 12/1961 | Schaar | 264—154 |
| 3,092,439 | 6/1963 | Harrison | 264—154 |

ROBERT F. WHITE, *Primary Examiner.*

S. I. LANDSMAN, *Assistant Examiner.*